March 25, 1969 D. A. MEIER 3,435,434

TWO-MAGNETIC ELEMENT MEMORY PER BIT

Filed March 31, 1965 Sheet 1 of 7

INVENTOR
DONAL A. MEIER

BY Louis A. Kline
John T. Matlago
Nathan Cass
HIS ATTORNEYS

INVENTOR
DONAL A. MEIER

BY Louis A Kline
John J. Matlago
Nathan Gass
HIS ATTORNEYS

INVENTOR
DONAL A. MEIER

BY Louis A Kline
John J. Matlago
Nathan Cass
HIS ATTORNEYS

INVENTOR
DONAL A. MEIER

BY Louis A. Kline
John J. Matlago
Nathan Cass
HIS ATTORNEYS

INVENTOR
DONAL A. MEIER
BY Louis A. Kline
John J. Matlago
Nathan Cass
HIS ATTORNEYS March 25, 1969 D. A. MEIER 3,435,434

TWO-MAGNETIC ELEMENT MEMORY PER BIT

Filed March 31, 1965 Sheet 6 of 7

INVENTOR
DONAL A. MEIER

BY Louis A. Kline
John J. Mathago
Nathan Cass
HIS ATTORNEYS

TWO-MAGNETIC ELEMENT MEMORY PER BIT

Filed March 31, 1965 Sheet 7 of 7

INVENTOR
DONAL A. MEIER
BY
HIS ATTORNEYS

United States Patent Office 3,435,434
Patented Mar. 25, 1969

3,435,434
TWO-MAGNETIC ELEMENT MEMORY PER BIT
Donal A. Meier, Inglewood, Calif., assignor to The National Cash Register Company, Dayton, Ohio, a corporation of Maryland
Continuation-in-part of application Ser. No. 347,184, Feb. 25, 1964. This application Mar. 31, 1965, Ser. No. 444,349
Int. Cl. G11b 5/64, 25/00
U.S. Cl. 340—174 16 Claims

ABSTRACT OF THE DISCLOSURE

A digit-sense winding arrangement for a two-element per bit memory which provides delta noise cancellation in addition to noise cancellation provided by connecting the windings on the elements to form first and second common mode strings which are coupled to a sense amplifier transformer. The delta noise is substantially eliminated by taking advantage of the complementary nature of information stored in the respective common mode connected strings. This is accomplished by providing complementary digit currents for the two-element per bit memory which cancel out any noise signal resulting from an unbalance in the stored data pattern in one of the common mode connected strings by an equal and opposite noise signal produced by an identical stored data pattern unbalance in the other common mode connected strings.

This invention is a continuation-in-part of patent application Ser. No. 347,184, filed Feb. 25, 1964, now Patent No. 3,315,241, and relates generally to memory devices for use in computers, and more particularly to an improved bistable memory matrix arrangement and construction.

With the ever increasing use of digital computers in the business world, it has become of considerable importance to provide improved high speed, high capacity random access matrix-type memories for use therein, and it is accordingly the broad object of the present invention to provide an improved construction and arrangement for a memory of this type.

It is well known that a major factor which greatly hinders obtaining improvements in many aspects of bistable memory matrices (such as speed, capacity, packing density, power requirements, etc.) has been and still is the generation of noise within the matrix during operation. Such noise occurs for a number of reasons, such as capacitive and inductive coupling between windings and lines, stray-field coupling, partial switching of elements, lack of uniformity of element characteristics, and variations in the pattern of information storage in the matrix. Accordingly, it is an important object of the present invention to provide a construction and arrangement for a magnetic memory matrix which is able to reduce the noise generated therein to extremely low levels, and thereby provide significant improvements in memory performance and capability.

In addition to the above considerations, it is also of importance that a memory matrix be of simplified and economical construction. Accordingly, another object of the present invention is to provide a bistable memory matrix which combines simplicity and economy with extremely low noise generation.

A still further object of the present invention is to provide an improved construction and arrangement for a bistable magnetic memory of the two element per bit type.

Yet another object of the present invention is to provide an improved organization and mode of operation for a bistable magnetic memory of the two element per bit type.

The features and advantages of the present invention will be illustrated herein as applied to a thin film rod memory matrix of the same basic type as illustrated in the commonly assigned copending patent applications Ser. No. 795,934, filed Feb. 27, 1959, now Patent No. 3,228,012; Ser. No. 796,892, filed Mar. 3, 1959, now Patent No. 3,134,965; and Ser. No. 268,145, filed Mar. 26, 1963, now Patent No. 3,341,829. The important distinction, however, is that by applying the teachings of the present invention, the performance and capability of a thin film rod memory matrix of this type are significantly enhanced beyond what would otherwise be obtainable. Briefly, in accordance with the invention, a novel and unique two-rod per bit organization and operating mode is provided for such a thin film rod memory which achieves a remarkably high degree of balancing, resulting in a memory with extremely low noise generation.

The specific nature of the invention as well as other objects, uses and advantages thereof will become apparent from the following description of a thin film rod memory matrix embodying the invention and illustrated in the accompanying drawings in which.

Figures 2, 3, 8, 8A:
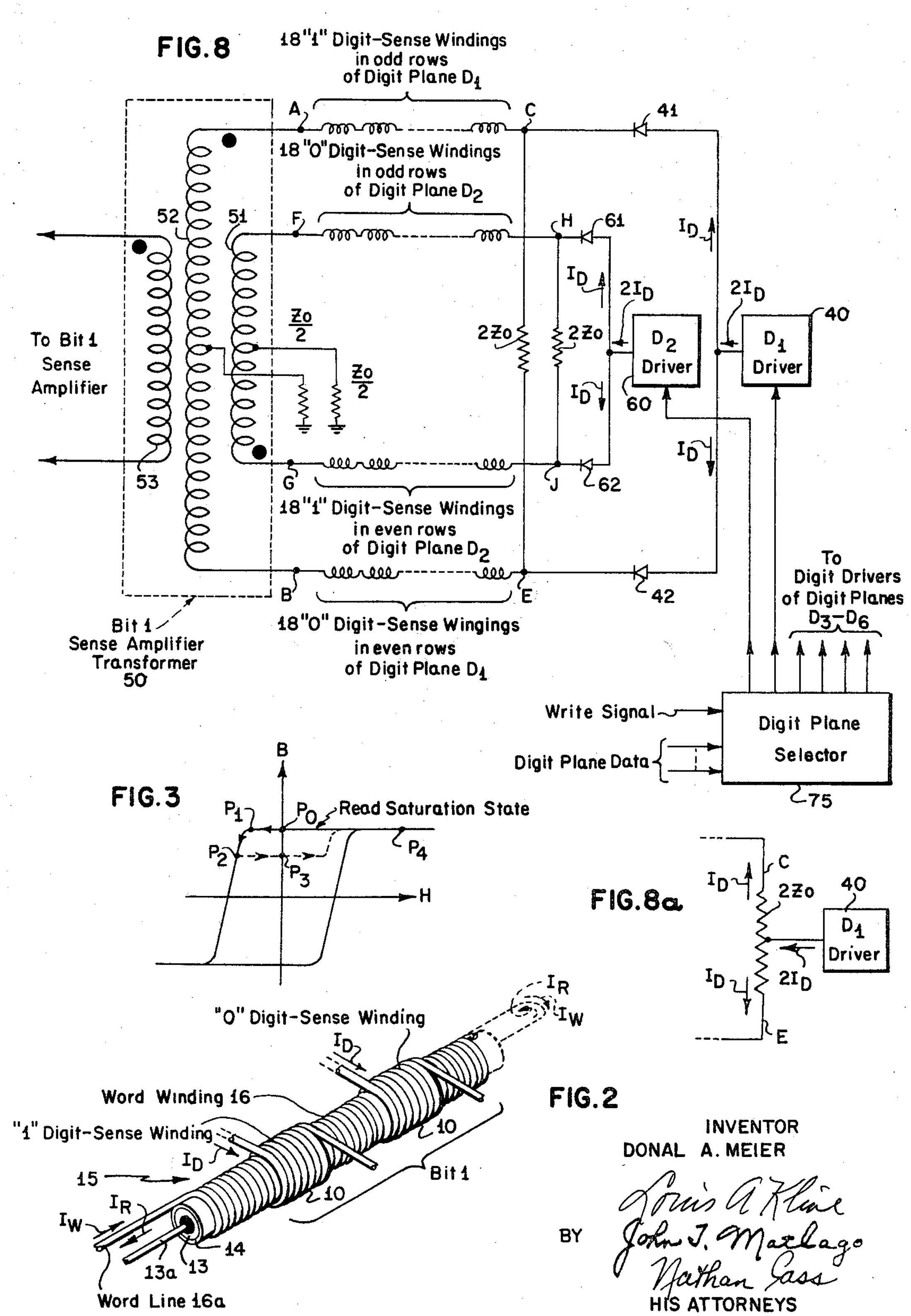
FIG. 2 is a fragmentary pictorial view showing a pair of "0" and "1" digit-sense windings of a typical bit and the respective portion of a rod structure passing therethrough.
FIG. 3 is a graph illustrating a preferred B–H loop characteristic for each individually switchable bistable element on the rods, and also illustrates the path followed by a typical bistable element during a writing and reading operation.
FIG. 8 is an electrical circuit diagram illustrating the connection and arrangement of the digit-sense windings in digit planes $D_1$ and $D_2$ of the matrix of FIG. 1 with respect to the sense amplifier coupling means and the digit plane drivers.
Figure 10:
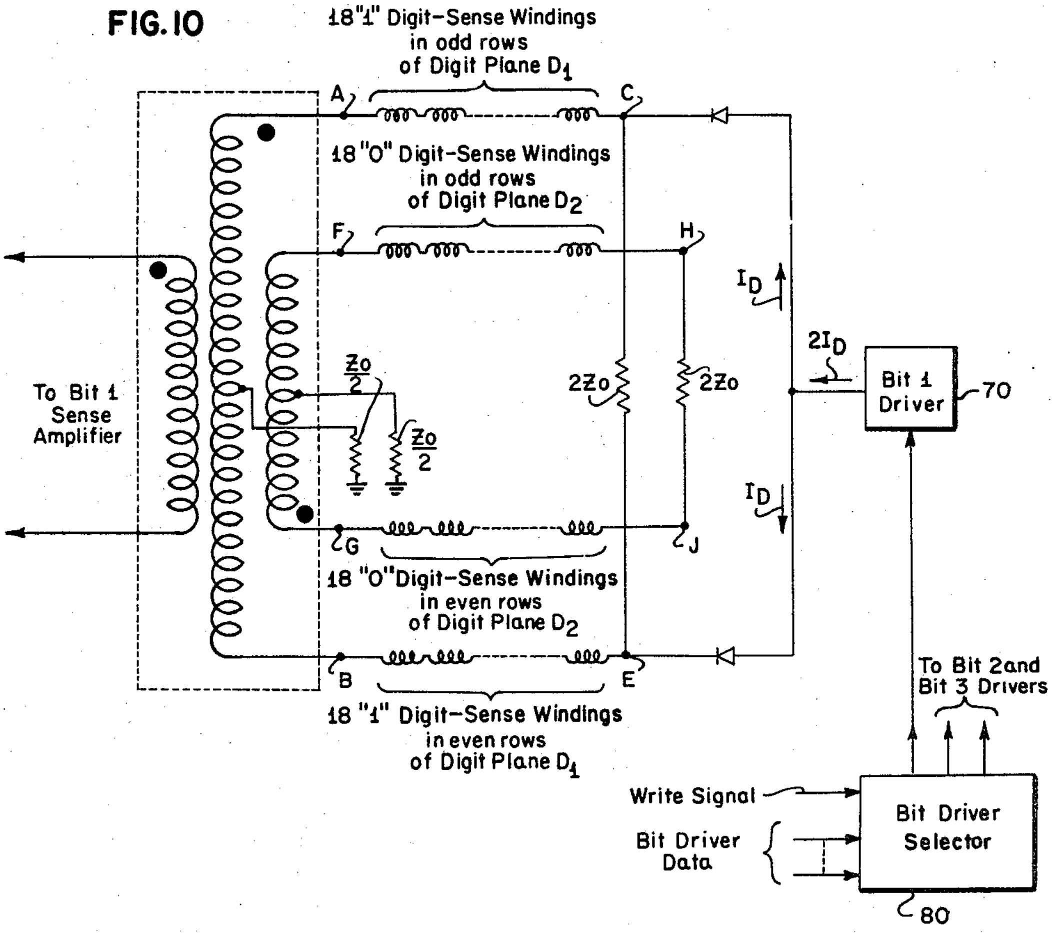
Figure 9:
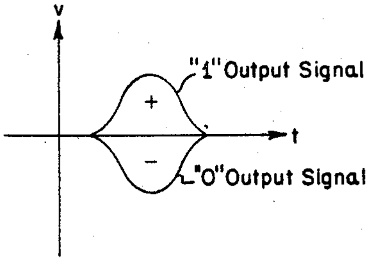
Figure 11:
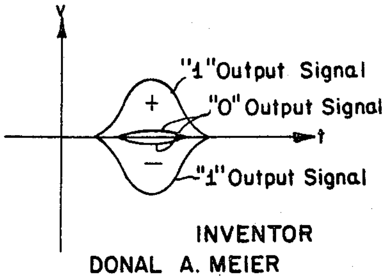
Figure 12:
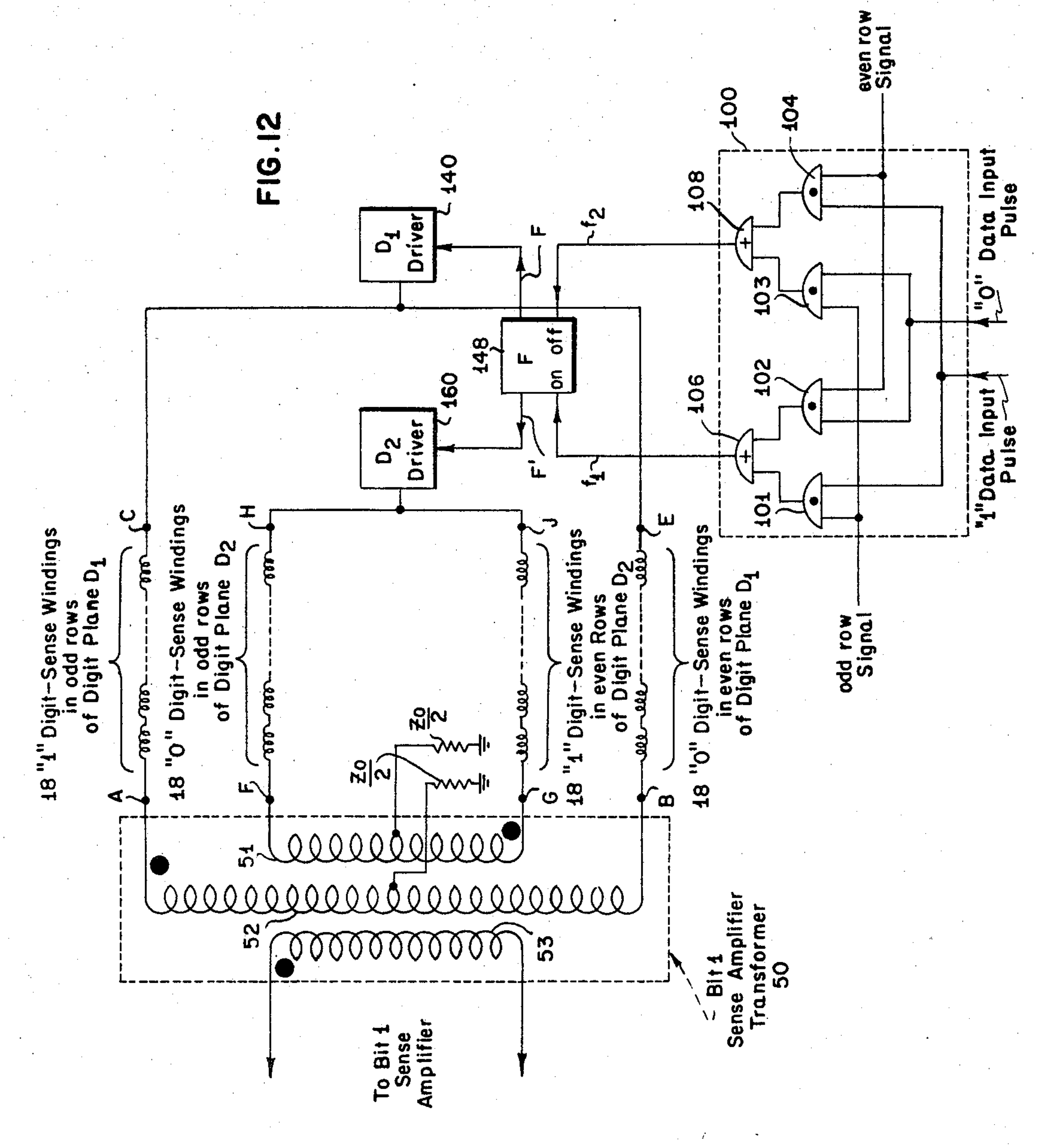
Figure 13:
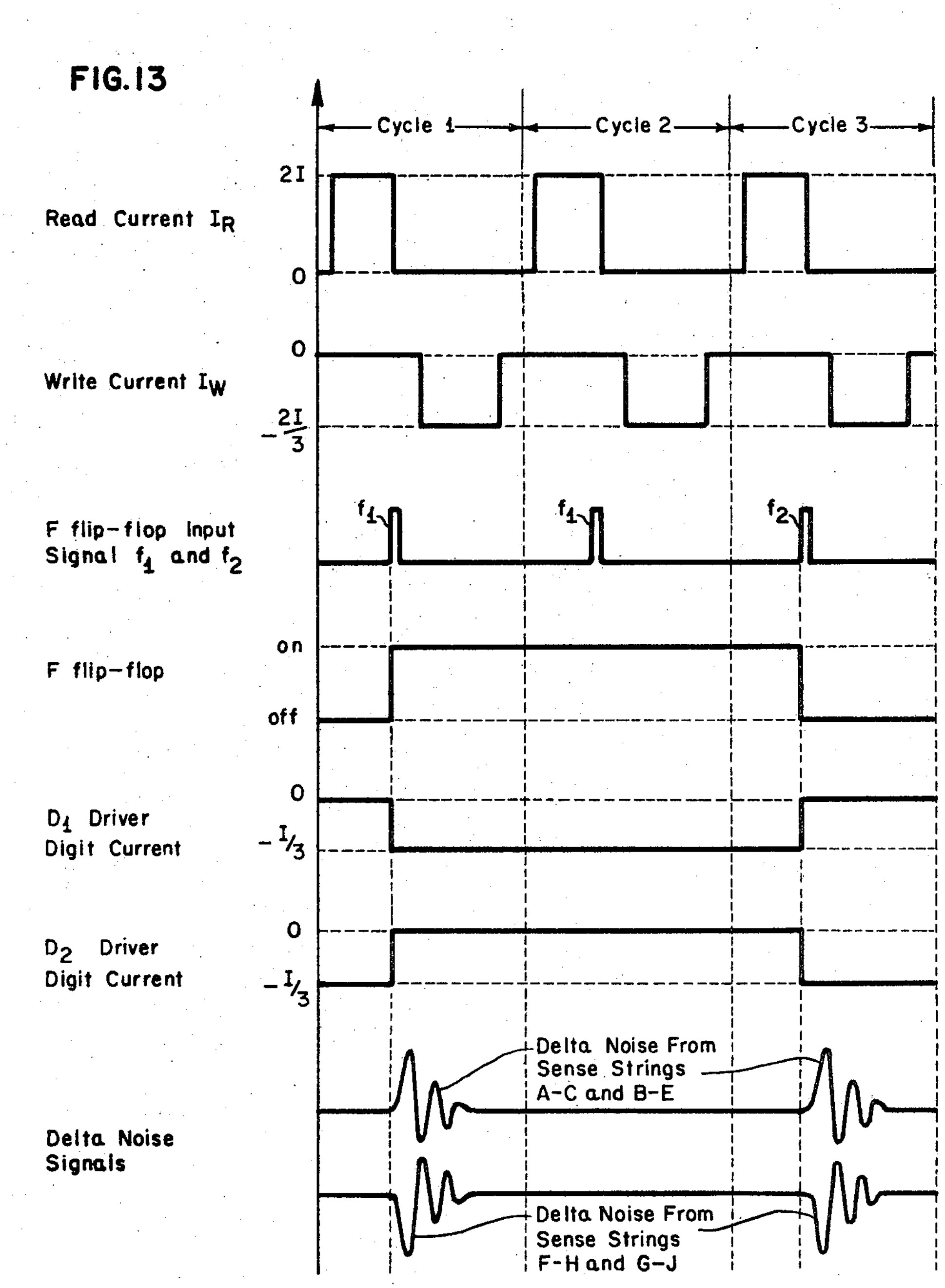
Figure 14:
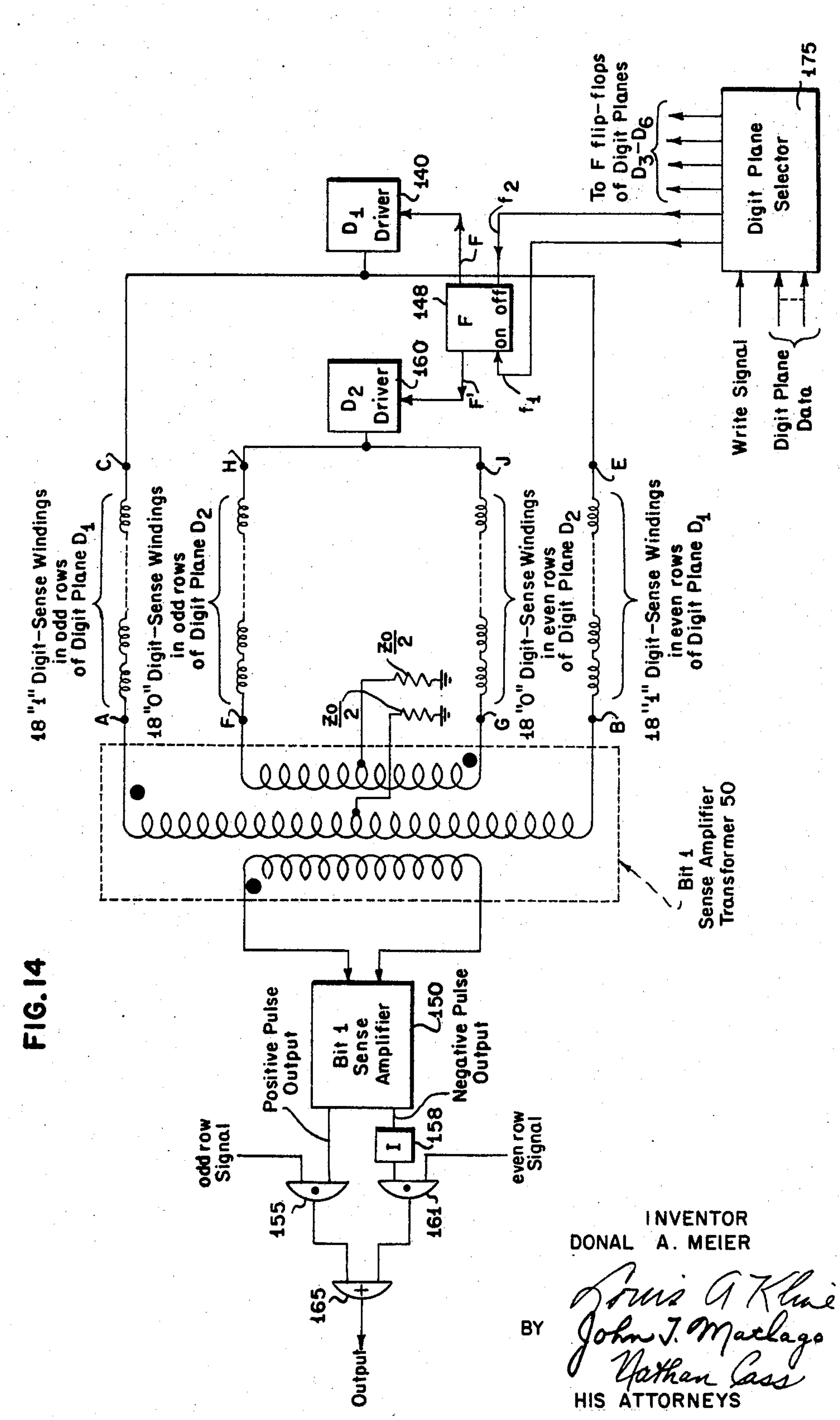

FIG. 8*a* is a fragmentary circuit diagram illustrating a modified digit current driving arrangement which could be employed in the circuit of FIG. 8;

FIG. 9 is a graph illustrating a "1" output signal and a "0" output signal applied to a bit sense amplifier as a result of the reading of a stored "1" and a stored "0" in a respective bit in the arrangement of FIG. 8;

FIG. 10 is an electrical circuit diagram illustrating a modification of the circuit of FIG. 8;

FIG. 11 is a graph illustrating a "1" output signal and a "0" output signal applied to a bit sense amplifier as a result of the reading of a stored "1" and a stored "0" in a respective bit in the modified arrangement of FIG. 10;

FIG. 12 is an electrical circuit diagram illustrating another modification of the invention which offers the additional advantage of providing delta noise cancellation;

FIG. 13 is a graph illustrating the operation of the circuits of FIGS. 12 and 14; and FIG. 14 is an electrical circuit diagram illustrating still another modification of the invention which, like FIG. 12, offers the additional advantage of providing delta noise cancellation.

Like numerals designate like elements throughout the figures of the drawings.

Figure 1:
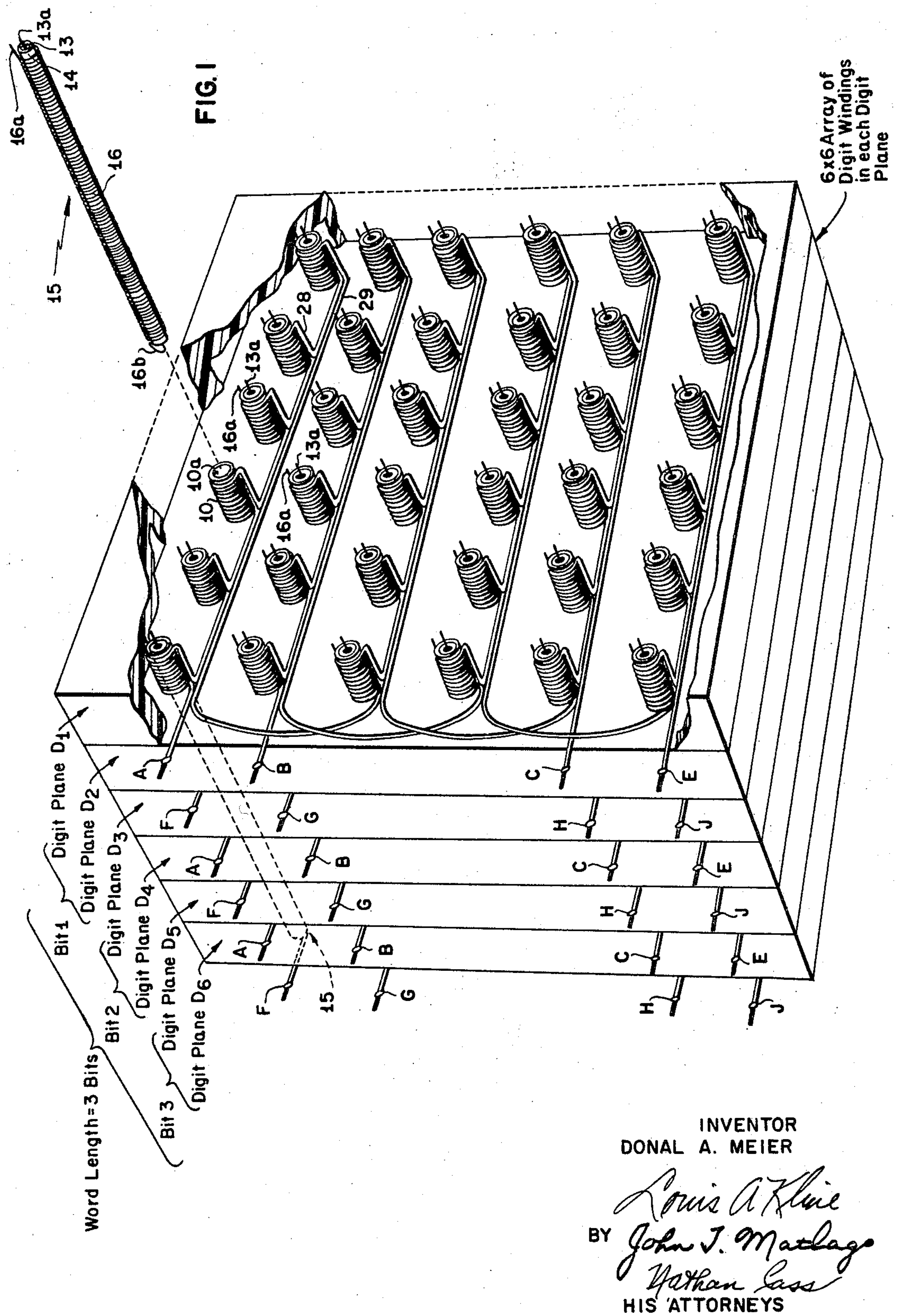
FIG. 1 is an overall pictorial view of a rod matrix incorporating the present invention, a single typical rod structure being shown external to the matrix in a position ready for insertion.

FIG. 1 illustrates an exemplary basic overall memory matrix structure which will be seen to be basically similar to those disclosed in the aforementioned copending patent applications. The exemplary memory structure of FIG. 1 comprises a plurality of digit planes (or plates) $D_1$–$D_6$ which are suitably stacked and secured together in aligned fashion, with rod structures 15 being provided passing perpendicularly through aligned bores provided in respective aligned digit windings in respective digit planes.

Each digit plane may comprise, for example, a 6 x 6 array of electrically interconnected digit-sense windings, and each digit-sense winding is constructed in the form of a solenoid 10 with a cylindrical bore 10*a* provided therein of a diameter preferably just sufficient to permit a respective thin film rod structure 15 and its associated word winding 16 (which is a coaxial helical solenoid) to be passed therethrough.

As indicated in FIGS. 1 and 2, each thin film rod structure 15 is preferably comprised of a long thin rod-like inner conductive substrate 13 of beryllium copper having a diameter of about 10 mils, and on which is suitably deposited a thin film magnetic coating 14 having bistable magnetic switching properties. The thickness of the thin magnetic film 14 should be small enough (about 10,000 angstroms or less) so that the film exhibits single domain switching properties. The thin magnetic film 14 may typically be an isotropic 1,000 or 2,000 angstrom electrodeposited coating of an alloy of approximately 97% iron and 3% nickel, or a suitable bilayer of the type disclosed in the commonly assigned copending application Ser. No. 77,451, filed Dec. 21, 1960, now Patent No. 3,213,431, or a permalloy thin film of approximately 80% nickel and 20% iron.

As noted previously, each rod structure 15 contains a coaxial helical solenoid 16 closely wound on the rod and serves as a word winding as will become evident hereinafter. The basic bistable magnetic storage element in the matrix is substantially the portion of the thin film magnetic coating 14 which is in the immediate vicinity of each digit-sense solenoid when the rod structure 15 is inserted in the matrix. Each rod structure, therefore, provides six individual bistable magnetic storage elements which, in a two magnetic element per bit arrangement, provides for the storage of three binary digits or bits.

In other words, in the typical embodiment being considered herein, each binary digit or bit is represented by the states of two adjacent bistable magnetic elements on the same rod structure. The manner in which these states are used to represent a binary digit or bit is as follows. If it is assumed that the two states of a bistable magnetic element are designated as A and B, then a "0" may be represented in a two magnetic element per bit arrangement when one bistable element (hereinafter called the "0" bistable magnetic element) of the binary digit resides in the A state, and the other bistable element (hereinafter called the "1" bistable element) resides in the B state; and a "1" may be represented by the reverse situation where the "1" bistable element of the binary digit resides in the A state and the "0" bistable element resides in the B state.

The three binary digits which each rod structure is thus capable of storing in two-magnetic element per bit fashion (as indicated above) may be considered to constitute a three bit word. As is well known in the art, a word is merely a convenient designation for a particular group of binary digits or bits which are handled together. Since there are 36 rods in the exemplary memory matrix shown in FIG. 1, the memory may be referred to as a 36 word memory. Obviously, the memory may be enlarged to store many more words having many more binary digits per word, the memory illustrated in FIG. 1 being merely exemplary.

Before considering how the various digit-sense and word windings in the three dimensional matrix of FIG. 1 are interconnected, it will be helpful to first consider the manner in which a single binary digit or bit may be stored in and read out from its respective rod.

As mentioned previously, the two bistable magnetic elements which are used to represent a binary digit or bit in the two magnetic element per bit arrangement being employed herein are chosen as adjacent portions on the same rod. Such a choice is highly advantageous since these two adjacent portions can be expected to have very similar magnetic properties as a result of the fact that a rod can be fabricated under continuous, automatic procedures which produce highly uniform thin film coatings, particularly on the same rod, and most particularly on adjacent portions on the same rod. A typical manner in which such automatic fabrication can be provided is described in the article "The Magnetic Rod—A Cylindrical, Thin Film Memory Element," by D. A. Meier and A. J. Kolk, published on pages 195–212 in the book "Large-Capacity Memory Techniques for Computing Systems," edited by Marshall C. Yovits, The Macmillan Company, New York, 1962.

Referring now to FIG. 2, a fragmentary portion of a rod structure 15 is illustrated corresponding to digit planes $D_1$ and $D_2$ and showing the respective digit-sense solenoids corresponding to bit 1 which are disposed over adjacent portions of the rod and its word winding 16 when the rod structure 15 is inserted in the matrix. The thin magnetic film 14 on the rod is preferably initially magnetized throughout its length to the read saturation state, as indicated in the preferred B–H hysteresis curve of FIG. 3, which is advantageous because signals tending to drive the thin film away from the read state will then not be influenced by demagnetization. In the absence of any applied field, therefore, the two respective bistable magnetic elements encircled by their respective digit-sense solenoids and the respective concentric portion of the word winding 16 will initially reside in the read saturation state at point $P_0$ in FIG. 3. As will become evident hereinafter, point $P_0$ is also the point at which both bistable elements will reside after a reading operation, since the mode of operation of the embodiment being described herein is of the destructive type.

The writing of a "1" or "0" into the two bistable elements constituting a binary digit or bit in FIG. 2 is accomplished as follows. When it is desired to write into a particular word in the array, a write current pulse $I_W$ is applied to the word winding 16 of the rod corresponding to the word which is selected for writing. This write current pulse $I_W$ flows through the word winding 16 and drives each bistable magnetic element of the selected word to point $P_1$ in FIG. 3, which as will be noted is insufficient to cause switching from the read saturation state.

Simultaneously with the write current pulse $I_W$, a digit current pulse $I_D$ is also applied, but to only one of the two digit-sense windings provided for each bit—that is, to either the "0" digit-sense winding or the "1" digit-sense winding of each bit of the selected word, depending on whether a "0" or a "1" is to be written in the respective bit. For example, for bit 1 in FIG. 2, if a "1" is to be written, the digit current pulse $I_D$ will beapplied only to the "1" digit-sense winding. The effect of applying the digit current pulse $I_D$ simultaneously with the write current pulse $I_W$ causes the thus selected "0" or "1" bistable element of each bit to be switched out of the read saturation state to point $P_2$ in FIG. 3.

As a result, when the write and digit current pulses $I_W$ and $I_D$ are removed, the "1" or "0" bistable element of each bit which received only the write current pulse $I_W$ will return to point $P_0$, while the other bistable element of each bit which also received the digit current pulse $I_D$ will return to point $P_3$ in FIG. 3. It is to be noted for future reference that the digit current pulse $I_D$, like the write current pulse $I_W$, is insufficient by itself to cause switching.

In order to read out the data thus written into each bit of a selected word, as described above, a read current pulse $I_R$ is applied to the word winding 16 which drives all of the bistable elements of the selected word to point $P_4$ in FIG. 3. The read current pulse $I_R$ is preferably chosen considerably greater than the minimum required for switching in order to provide a rapid switching time. It will thus be understood that the particular bistable element of the pair constituting a bit which was switched to point $P_3$ during writing will now be switched back to the read saturation state during the reading operation. The change in flux which will then occur between $P_3$ and the read saturation state induces a signal into the respective digit-sense solenoid which is used as a sense winding during reading. The other bistable element of each bit, which will be at point $P_0$ after the writing operation, is also driven to point $P_4$, but since only a very small flux change occurs, only a negligible signal is induced in its respective digit-sense solenoid.

It will thus be evident from the foregoing that the binary digit "1" or "0" stored in each bit on the rod during a writing operation can be determined during a reading operation by noting whether the "0" or the "1" digit-sense solenoid of a bit has an output signal induced therein. For example, for bit 1 illustrated in FIG. 3, if the "1" digit-sense winding has an output signal induced therein during the reading operation a "1" is indicated, or conversely, if the "0" digit-sense winding has an output signal induced therein during the reading operation, then a "0" is indicated.

The above description of a typical reading and writing operation in a two-magnetic element per bit arrangement on a rod structure has assumed that only a partial switching of the selected "1" or "0" bistable element of each bit occurs—that is, as indicated in FIG. 3, the selected bistable element is driven only to point $P_2$ in FIG. 3 rather than all the way to the other saturation state. It will be understood that such partial switching operation may be accomplished by appropriately controlling the magnitude and time duration of the write and digit current pulses $(I_W+I_D)$, since the write disturb characteristics of a bistable magnetic element are dependent upon both the magnitude as well as the time duration of the resultant writing current waveform. It will also be understood that for partial switching, it is preferable that a hysteresis loop with sloping sides be employed as illustrated in FIG. 3.

Such partial switching operation as described above permits a much faster cycle time to be achieved, since the time necessary for such partial switching (during both reading and writing) can be very much smaller than would be necessary if switching from one saturation state to the other were required. However, while such partial switching may permit a much faster cycle time, it will be evident that the change of flux occurring is correspondingly smaller, making it difficult to obtain a useable signal-to-noise ratio in a memory matrix. In accordance with the present invention, however, a memory matrix construction and arrangement is provided which takes advantage of the thin film rod memory construction to provide such a remarkably high degree of balancing that almost perfect noise cancelling can be achieved. The result is that an output signal which would otherwise be unusably small is now useable so that full advantage may be taken of partial switching techniques to greatly increase the memory read-write cycle time, permitting a practical size memory to be achieved with a cycle time of the order of 100 nanoseconds. Also, the high degree of balancing and noise cancellation achieved by the present invention permits a higher packing density as well as permitting a significant reduction in memory current requirements.

The manner in which the digit-sense and word windings in the matrix of FIG. 1 are arranged and interconnected in order to achieve a high degree of noise cancellation in accordance with the invention will now be considered in detail with additional reference to FIGS. 4–8.

Figure 4:
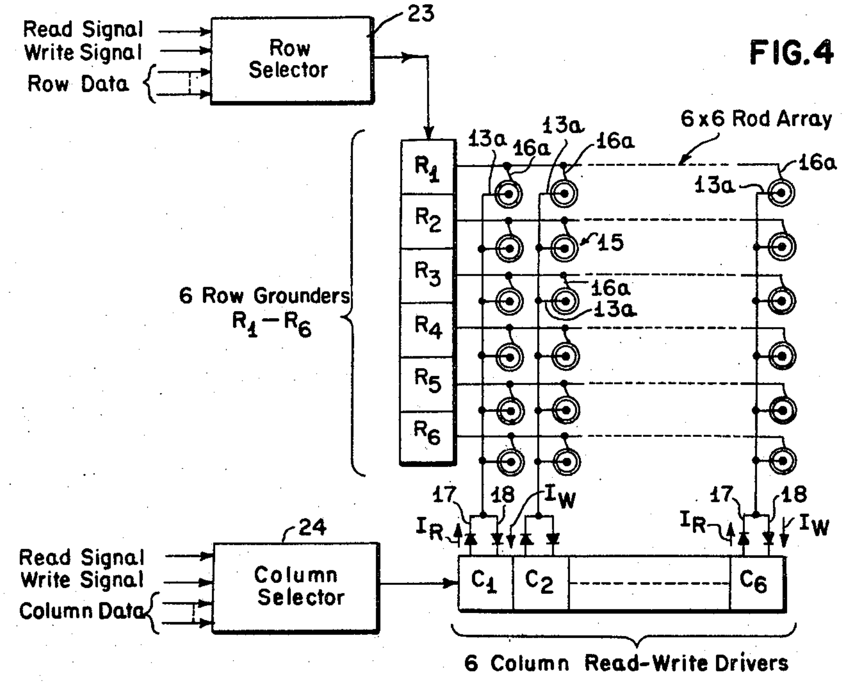
FIG. 4 is a schematic and electrical diagram illustrating how the word windings of the rods in the matrix of FIG. 1 may be connected in a linear selection arrangement so as to permit a word winding of a selected rod structure to be selected to receive either a read or a write current.

Considering first the connection and arrangement of the word windings, it will be understood from FIGS. 1, 2 and 4 that the return path for the word winding 16 on each rod structure 15 is provided by utilizing the inner conductive substrate 13 to which the back end of the word winding **16*b* (FIGS. 1 and 7) is suitably connected at the back of the rod, such as by soldering. Then, by providing a lead wire 13*a* connected to the inner substrate 13 at the front of each rod structure, the two leads 13*a* and 16*a*** will be available at the front of each rod structure for interconnection in a conventional linear selection word line arrangement, as illustrated in FIG. 4.

It is to be noted that the use of the inner conductive substrate 13 of each rod structure 15 as a return path as just described not only eliminates the need for an additional return path, but also provides a circular or transverse field (which is in addition to the axial field) and aids switching so that a smaller read and write current can be used. But most importantly, the circular or transverse magnetic field produced by current flow in the inner substrate 13 acts to cancel the external or stray circular magnetic field produced around each rod by the word line and the pitch of the word windings, thereby reducing this type of inter-rod coupling. It may also be noted that inter-rod coupling due to the stray axial field is already greatly reduced, since the cross-sectional area of each rod is so small (of the order of .010 inch) that it will couple very little of the axial field of an adjacent rod.

Having explained how stray coupling between rods is greatly reduced by the rod construction employed herein, it will next be explained how the linear selection word line arrangement of FIG. 4 operates to permit a particular word line or a rod structure to be selected for receipt of a read current pulse $I_R$ or a write current pulse $I_W$. It will be seen in FIG. 4, that the leads **16*a* from the rod structures in each of the six rows are connected together and to a respective one of the six row grounders $R_1$–$R_6$, while the leads 13*a* from the rod structures in each column are connected together and to a respective one of the six column drivers $C_1$–$C_6$ through a respective pair of oppositely poled diodes 17 and 18**.

It will be understood that such a connection of windings as shown in FIG. 4 (conventionally referred to as a linear selection arrangement) permits the word windings of a single predetermined rod word line **13*a*, 16*a* to be selected to receive a read or write current. This is accomplished by activating the column driver and row grounder which correspond to the row-column coordinates of the rod structure which is to be selected. For example, selection of column driver $C_1$ and row grounder $R_1$ during a reading operation will result in a read current $I_R$ flowing only in the word winding of the rod structure in row 1 and column 1, since only this word winding will have a completed path for the flow of read current $I_R$ from $C_1$ to $R_1$. As is well known with regard to linear selection systems, diodes 17 and 18** (one for the read current $I_R$ and the other for the write current $I_W$) are provided for each column driver in order to prevent sneak currents from flowing in unselected lines.

From the foregoing description of FIG. 4, it should now be evident that the read and write currents $I_R$ and $I_W$ required during reading and writing into and out of the binary digits or bits on a selected rod structure (as previously described) may readily be provided in a conventional manner, such as illustrated in the commonly assigned copending application Ser. No. 268,145, filed Mar. 26, 1963, now Patent No. 3,341,829. It is merely necessary to design the column drivers and row drivers so as to be individually selectable (such as by row selector 23 and column selector 24 in FIG. 4) to supply read and write currents $I_R$ and $I_W$ during respective read and write periods in accordance with the row-column coordinates of the selected rod structure. As is conventional, the operation of the typical embodiment of the invention being described herein is such that a writing operation always follows a reading operation, either to re-write the data which was read out during reading, or to write in new data. Also, only one word is read out or written into during each read-write cycle.

Figure 5:
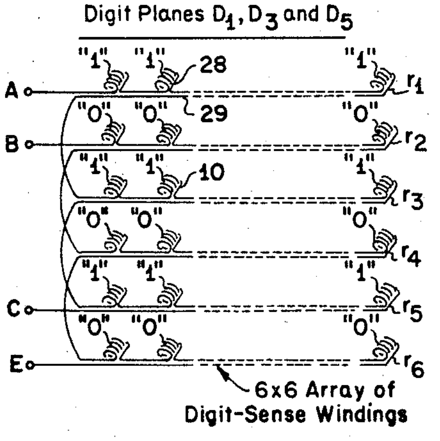
FIGS. 5 and 6 are schematic partially pictorial views illustrating the connection of the digit-sense windings in each digit plane of the matrix of FIG. 1.
Figure 6:
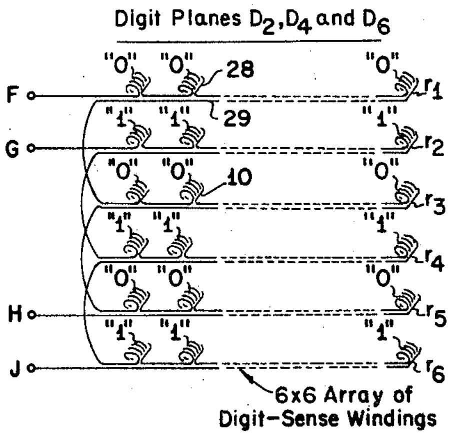

Now that the linear selection interconnection arrangement of the rod word windings has been explained, the interconnection arrangement employed for the digit-sense windings will next to considered with particular reference to FIGS. 1, 5 and 6. It will be remembered that the digit-sense windings perform the digit function during writing and the sensing function during reading so that the interconnection arrangement must take this into account. Also, the interconnection arrangement must provide for appropriate noise cancellation which, as will shortly become evident, is provided to an extremely high degree in accordance with the present invention.

Referring to FIGS. 5 and 6, it will be noted that FIG. 5 shows the winding arrangement for the digit-sense solenoids in digit planes $D_1$, $D_3$ and $D_5$, while FIG. 6 shows the winding arrangement for the digit-sense solenoids in digit planes $D_2$, $D_4$ and $D_6$, the digit planes being located as shown in FIG. 1. As indicated in FIGS. 1, 5 and 6 the solenoids in each digit plane are wound serially in each row, and the return wire for each row (such as indicated at 29 in FIGS. 1 and 6) is looped back along a path adjacent the solenoid interconnecting wires of the same row. By so doing, circular magnetic fields produced by inter-solenoidal connection wires in each row will be substantially cancelled in a manner similar to that achieved using the inner conductive substrate 13 as the return path as was described previously. To provide even further magnetic field cancellation, the return wire for each individual solenoid (indicated by numeral 28 in FIGS. 1 and 6) is perpendicularly returned adjacent and in contact with its respective solenoid so as to approximately cancel out the circular magnetic field produced by the pitch of the solenoid.

Continuing with the description of the digit-sense winding arrangement, it will be seen from FIGS. 5 and 6 that, in each digit plane, all of the odd rows ($r_1$, $r_3$ and $r_5$) of digit-sense windings are connected together to form a first series string (across points A and C in FIG. 5 and points F and H in FIG. 6), and all of the even rows ($r_2$, $r_4$ and $r_6$) of digit-sense windings are connected together to form a second series string (across points B and E in FIG. 5 and G and J in FIG. 6). In addition, as indicated by appropriate "1" and "0" designations, the arrangement of digit-sense windings is such that, in digit planes $D_1$, $D_3$ and $D_5$ illustrated in FIG. 5, the digit-sense windings in odd rows are associated with the "1" bistable element of their respective binary digits, while the digit-sense windings in even rows are associated with the "0" bistable element of their respective binary digits. In digit planes $D_2$, $D_4$ and $D_6$ illustrated in FIG. 6, it will be seen that the opposite "1" and "0" designations exist, the odd row digit-sense windings being associated with the "0" bistable elements of their respective binary digits, and the even row digit-sense windings being associated with the "1" bistable elements of their respective binary digits.

Figure 7:
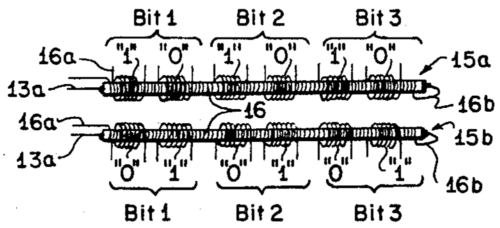
FIG. 7 illustrates the bistable magnetic designations provided along an odd row rod structure and an even row rod structure as a result of the digit-sense winding arrangement of FIGS. 5 and 6.

The resulting rod structure arrangement of "0" and "1" bistable elements provided by the digit-sense winding arrangement of FIGS. 5 and 6 is illustrated in FIG. 7 for an odd row rod structure **15*a*, and for an even row structure 15*b***.

The manner in which the above-described digit-sense winding arrangement is connected to a sense amplifier in accordance with the invention so as to achieve a high degree of noise cancellation will next be considered with reference to FIG. 8. It will be understood that since each word in the exemplary matrix illustrated in FIG. 1 has three binary digits or bits, three sense amplifiers are required, one for each binary bit. More specifically, digit planes $D_1$ and $D_2$ corresponding to bit 1 have their digit-sense windings connected to a bit 1 sense amplifier, digit planes $D_3$ and $D_4$ corresponding to bit 2 have their digit-sense windings connected to a bit 2 sense amplifier, and digit planes $D_5$ and $D_6$ corresponding to bit 3 have their digit-sense windings connected to a bit 3 sense amplifier.

While FIG. 8 illustrates the sense amplifier connection for only planes $D_1$ and $D_2$ corresponding to bit 1, it will be understood that the digit planes for bits 2 and 3 are connected to their respective bit sense amplifiers in a similar manner. Since digit planes $D_1$, $D_3$ and $D_5$ are the same, digit planes $D_3$ and $D_5$ will be connected to their respective bit sense amplifiers in the same way as illustrated for digit plane $D_1$ in FIG. 8; also, since digit planes $D_2$, $D_4$ and $D_6$ are the same, digit planes $D_4$ and $D_6$ will be connected to their respective bit sense amplifiers in the same way as illustrated for digit plane $D_2$ in FIG. 8.

Now considering FIG. 8 in detail, it may be noted at the outset that the points designated by letters A, B, C, E, F, G, H and J in FIG. 8 correspond to like-lettered points in FIGS. 1, 5 and 6, thereby permitting each series string of digit-sense windings to be easily identified. For example, the series-connected string of 18 "1" digit-sense windings in odd rows of digit plane $D_1$ shown connected across points A and C in FIG. 8 represents the series-connected string of digit-sense windings in odd rows $r_1$, $r_3$ and $r_5$ in FIG. 5, which are also shown connected across points A and C and will be seen to comprise 18 "1" digit-sense windings as designated in FIG. 8.

The sense amplifier coupling means provided between the digit-sense windings of each bit and its respective bit sense amplifier may typically comprise a sense amplifier transformer 50 as indicated for the bit 1 sense amplifier in FIG. 8. The transformer 50 has three windings 51, 52 and 53, a "dot" being provided at one end of each transformer winding in a conventional manner to indicate the winding polarity. For the sake of this description, the "dot" will be considered to represent a positive polarity. As shown in FIG. 8, winding 51 is connected across points F and G, winding 52 is connected across points A and B (points A and G and points B and F being connected in the same polarity sense), and winding 53 is fed to the sense amplifier. Windings 51 and 52 are center-tapped and each center tap is connected to circuit ground through an impedance $Zo/2$, where $Zo$ is the characteristic impedance of the respective digit-sense lines connected thereto, such impedance terminations serving to prevent unwanted reflections.

At the right in FIG. 8, the manner in which digit current is applied to the digit-sense windings of planes $D_1$ and $D_2$ is illustrated. It will be seen that digit plane $D_1$ is provided with a driver 40 and digit plane $D_2$ is provided with a driver 60, each driver being capable of providing an output current pulse $2I_D$ in response to a signal received from a digit plane selector 75. It will be understood that only one of the drivers 40 and 60 is activated by the selector 75 during a writing interval, depending on whether a "0" or a "1" is to be written into the respective bit. As indicated in FIG. 8, the digit current $2I_D$ produced by each digit driver when activated is fed in parallel to the odd and even digit-sense windings of the respective plane through respective suitably matched isolating diodes (41 and 42 for digit plane $D_1$ and 61 and 62 for digit plane $D_2$). Since the driver digit current of $2I_D$ divides equally between the odd and even series-connected strings of digit-sense windings, the resulting digit current flowing in each digit-sense winding of the selected digit plane will be of value $I_D$ in accordance with the previously described writing operation. An impedance of $2Zo$ (where $Zo$ is again the characteristic impedance) is connected across points C and E and across points H and J in FIG. 8, which is done in order to provide proper line terminating impedances which will eliminate reflections.

It is to be understood that instead of feeding the output of the digit drivers $D_1$ and $D_2$ to their respective series strings via diodes 41, 42, 61 and 62 as shown in FIG. 8, these diodes could be eliminated, in which case the drivers $D_1$ and $D_2$ would be fed to their respective series strings by connecting the output of each driver to approximately the center of a respective one of the impedances $2Zo$, as illustrated for the $D_1$ driver 40 in FIG. 8*a*.

With the above description of the matrix and its winding arrangement in view, the overall operation of the matrix will now be illustrated by describing an example of a typical read-write cycle involving the rod structure in row 1 and column 1, which will be assumed to store the three-bit word 101 which is to be read out and a new three-bit word 010 written therein.

The read-write cycle may be considered to be initiated by the appearance of a read signal which is applied to the row selector 23 and the column selector 24 in FIG. 4 along with respective row and column data to permit selection of the desired row grounder and column driver during the reading operation. Since the rod structure in row 1 and column 1 is the selected one in the present example, the row selector 23 will select row grounder $R_1$ while the column selector 24 will select column driver $C_1$. As a result, a read current $I_R$ will flow from column driver $C_1$, through its respective diode 17, through the word winding 16 (see FIGS. 1, 2 and 7) of the rod structure in column 1 and row 1, and back to circuit ground through row grounder $R_1$. The effect of the read current $I_R$ flowing in the word winding 16 of the selected rod structure is to cause all of the six bistable elements thereon to be driven to point $P_4$ in FIG. 3.

Since in the present example it is assumed that the row 1, column 1 rod structure stores the word 101, the "1" bistable element of bit 1, the "0" bistable element of bit 2, and the "1" bistable element of bit 3 will be driven from $P_3$ to $P_4$ in FIG. 3 by read current $I_R$, causing an output pulse to be induced in each respective digit-sense winding. Considering only bit 1 for the moment, it will be understood from FIGS. 5, 6 and 8 that the output pulse induced in the "1" digit-sense winding of bit 1 of the row 1, column 1 rod (which is in an odd row) will appear in the series string A–C of digit plane $D_1$. Since the series string A–C is connected to the dotted end of transformer winding 52 in FIG. 8, the signal induced in series string A–C will cause a positive "1" output signal (as typically illustrated in FIG. 9) to be applied to the bit 1 sense amplifier from transformer winding 53 to thereby indicate the storage of a "1" in bit 1 of the selected word. Since bit 3 also contains a "1," the bit 3 sense amplifier will similarly receive a positive signal from series string A–C of digit plane $D_5$, via the respective sense amplifier transformer.

With regard to bit 2 of the selected word, which is assumed to store a "0," the driving of its "0" bistable element from point $P_3$ to point $P_4$ in FIG. 3 will induce an output signal in the series string F–H of digit plane $D_4$. Since series string F–H is applied to the undotted end of its respective bit 2 transformer winding 51 (as will be noted in FIG. 8 for digit plane $D_2$), a negative "0" output signal (as also illustrated in FIG. 9) will be applied to the bit 2 sense amplifier via the sense amplifier transformer 50 to indicate the storage of a "0" in bit 2 of the selected word.

It will be understood from FIG. 8 that if a rod structure in an even row were the selected one (instead of the assumed row 1, column 1 rod which is in an odd row) and if bit 1 of such an even rod were assumed to store a "1," then the driving of the "1" bistable element from $P_3$ to $P_4$ during reading will cause an output signal to be produced in series string G–J, and since string G–J is applied to the dotted end of transformer winding 51, a "1" output signal (FIG. 9) will be applied to the bit 1 sense amplifier indicative of a stored "1"; corresponding, if such an even rod were to store a "0" in bit 1, then the "0" bistable element would be driven from $P_3$ to $P_4$ during reading to cause an output signal to be produced in series string B–E, and since string B–E is fed to the undotted end of the respective transformer winding 52, a negative "0" signal (FIG. 9) will be applied to the respective bit sense amplifier indicative of a stored "0."

So far in this example, the paths of the output signals applied to the respective bit sense amplifier during reading have been traced and it has been shown how, during reading of a selected word, a positive "1" output signal (FIG. 9) is applied to each respective bit sense amplifier if the corresponding bit stores a "1," and a negative "0" output signal (FIG. 9) if the corresponding bit stores a "0."

Proceeding now to a consideration of the writing operation in the exemplary read-write cycle being illustrated, it will be understood that a writing operation may be initiated following the just described reading operation by applying a write signal to the row selector 23 and column selector 24 in FIG. 4, along the respective row and column data to permit selection of the desired row grounder and column driver. Since the rod structure in row 1 and column 1 is the selected one in the present example, the row selector 23 will select row grounder $R_1$, while the column selector 24 will select column driver $C_1$, causing a write current $I_W$ to flow through the word winding 16 (FIGS. 1, 2 and 7) of the selected rod structure in row 1 and column 1.

It will be remembered from the previous discussion in connection with FIG. 2 that neither write current $I_W$ nor the digit current $I_D$, by itself, is sufficient to drive the six bistable elements on the selected rod out of the read saturation state (all bistable elements of the selected rod will reside at point $P_0$ in FIG. 3 after reading). As also explained previously in connection with FIG. 2, in order to provide for storage of either a "1" or a "0" in a bit, a digit current $I_D$ is applied simultaneously with the write current $I_W$ to either the "1" or "0" digit-sense winding, which together drive the thus selected respective bistable magnetic element of the bit to point $P_3$ in FIG. 3.

It will be seen in FIG. 8 that the write signal (which may be the same as applied to the row selector 23 and column selector 24 in FIG. 4) is also applied to a digit plane selector 75 along with digit plane data to indicate, in accordance with the word to be written (assumed to be 010), which of the two digit plane drivers provided for each bit (such as $D_1$ and $D_2$ for bit 1) is to be selected during writing. The manner in which digit current is caused to flow in the proper "0" or "1" digit-sense winding of each bit of the selected word will now be illustrated by considering how it is accomplished for bit 1, which the present example assumes is to have a "0" written therein.

Initially, it is to be noted that the bit 1 "0" digit winding of the row 1, column 1 rod structure is located in row 1 of digit plane $D_2$ (FIG. 6), so as to thereby be in the series string F–H of FIG. 8. Consequently, in order to write a "0" in bit 1, the digit plane selector 75 will select the $D_2$ driver 60, which in turn will cause a digit current $I_D$ to flow in the series string F–H containing the bit 1 "0" digit-sense winding; the sum of the write current $I_W$ and the digit current $I_D$ will then drive the respective "0" bistable element of bit 1 to point $P_3$ in FIG. 3 to thereby write a "0" in bit 1. It will be noted that selection of the $D_2$ driver 60 not only causes a digit current $I_D$ to flow in the digit-sense winding of the selected rod, but also the other digit-sense windings in the series string F–H, as well as the digit-sense windings in string G–J. However, such digit current flow will not cause unwanted switching, since these digit-sense windings are not on the selected rod, in which case their respective bistable magnetic elements will receive only the digit current which by itself is insufficient to cause switching.

It will be understood that if it were desired to write a "1" in bit 1 instead of a "0," then the digit plane selector 75 would select the $D_1$ driver 40 instead of the $D_2$ driver 60, causing a digit current $I_D$ to flow in series string A–C which contains the "1" digit-sense winding of bit 1 of the selected row 1, column 1 word.

It is also to be understood that if the selected word were in an even row, instead of an odd row, and it were desired to write a "1" therein, then the $D_2$ driver 60 would be selected to cause a digit current $I_D$ to flow in series string G–J which contains the "1" digit-sense winding of bit 1. If, on the other hand, it were desired to write a "0" in bit 1 of such an even rod, then the $D_1$ driver 40 would be selected to cause a digit current to flow in series string B–E which contains the "0" digit-sense winding of bit 1.

From the foregoing it will be evident that at the end of the writing period the desired word will have been written into the selected rod structure in row 1, column 1 in accordance with the selection of digit drivers made by the digit plane selector 75. Since it is assumed the full word 010 is to be written into the row 1, column 1 rod structure, which is in an odd row, digit drivers $D_2$, $D_3$ and $D_6$ will be selected during the writing operation by digit plane selector 75, while digit drivers $D_1$, $D_4$ and $D_5$ will remain unselected.

Now that a typical read-write cycle has been described, it is of considerable importance to note that the matrix winding arrangement described herein additionally provides for the cancellation of unwanted signals or noise generated during reading.

As far as inter-rod coupling due to stray axial and circular magnetic fields is concerned, it has already been explained how the use of a small diameter rod and the provision of a return path in close proximity to the forward path greatly reduces such inter-rod coupling and permits a high packing density to be obtained. However, there are other forms of coupling which produce unwanted signals or noise which must be cancelled out if the resultant noise is to be kept small, such as the noise arising as a result of capacitive and inductive coupling between word lines and digit-sense lines. While techniques—such as the use of strobing, common mode rejection and noise cancelling lines—can help reduce noise to some extent, considerable noise still remains, primarily because of the difficulty of obtaining a complete cancellation at each instant of time without degrading the output signal.

In the present invention, advantage is taken of the formation of each binary digit as two adjacent highly uniform bistable elements on the same rod structure to provide a noise cancellation arrangement, as illustrated in FIGS. 6–8, which results in an extremely high degree of noise cancellation within each binary digit, which is in addition to the usual common mode noise cancellation, whereby the entire matrix as a whole has a very low noise figure. In other words, the digit-sense solenoids in each digit plane are connected in common mode rejection fashion, and in addition, the two digit-sense solenoids of each binary digit are connected in an opposite polarity sense. Thus, when the various possible sources of noise in a magnetic memory matrix are considered and their effect is traced in the inter-connection arrangement illustrated in FIGS. 6–8, it will become evident that not only is the usual common mode rejection provided, but also, noise which is generated in a digit-sense winding associated with one bistable magnetic element of a selected rod is automatically cancelled out by a substantially equal and opposite noise signal generated in the digit-sense winding associated with the other bistable magnetic element of the same binary digit or bit.

It is to be understood that while the foregoing disclosure has primarily been concerned with a particular illustrative matrix, various modifications and variations can be made in both construction and arrangement without departing from the scope of the invention. For example, instead of using an enable-enable mode of operation, as described herein, an enable-inhibit operative mode can be employed in which the digit current acts in an inhibiting manner with respect to the write current. Also, instead of using a continuous word winding 16 on each rod structure, a plurality of spaced series-connected windings could be employed with the word winding spacing corresponding to the spacing of the digit windings.

Also, it will be understood that, instead of representing the "1" and "0" states of a binary bit by switching either the "1" or "0" bistable element of the two bistable elements of which each bit is constituted, a representation can be employed where one bistable element always remains in the read saturation state (see FIG. 3), while the other bistable element is left in the read saturation state to represent a "0," or switched to represent a "1." For such a representation, the same basic digit-sense winding arrangement can be employed as illustrated in FIGS. 5 and 6 with the difference that all the digit-sense windings in planes $D_1$, $D_3$ and $D_5$ are "1" windings and all the digit-sense windings in planes $D_2$, $D_4$ and $D_6$ are "0" windings so that every rod structure in the matrix will have a "1"–"0" arrangement as illustrated by rod structure 15*a* in FIG. 7. In such an arrangement the "0" digit-sense windings never receive digit current and their associated bistable magnetic elements are therefore never switched out of the read saturation state; only the "1" digit-sense windings in planes $D_1$, $D_3$ and $D_5$ receive digit current in such an arrangement.

The manner of connection of the digit-sense windings to their respective bit sense amplifiers for this modified type of operation now being considered may be as illustrated in FIG. 10 of digit planes $D_1$ and $D_2$. FIG. 10 is arranged similar to FIG. 8, and the same letters, A, B, C, E, F, G, H and J are employed for ease of understanding and comparison. It will be understood from FIG. 10 that, when a bit stores a "1," a "1" output signal (which may either be positive or negative as illustrated in FIG. 11) will be applied to the sense amplifier, via the sense amplifier transformer in response to a "1" bistable element in either string A–C or B–E being switched back to the read saturation state; on the other hand, if the bit stores a "0," a negligible output signal will be produced (as also illustrated in FIG. 11), since both bistable elements will already be in the read saturation state.

As far as writing is concerned in the arrangement of FIG. 10 since digit current is only applied to the "1" digit-sense windings, only one digit driver is required for each bit, as illustrated in FIG. 9 by the bit 1 driver 70 which feeds the "1" digit-sense winding strings A–C and B–E. The digit selector 75 in FIG. 8 then becomes the bit driver selector 80 shown in FIG. 10 having three outputs (one for each bit driver). The bit driver selector 80 operates during writing to select only those bit drivers whose respective bits are to have a "1" written therein.

It is further to be noted with respect to FIG. 10 that, by considering the various possible sources of noise and tracing their effect in the sense amplifier, it will become evident that this modified sense amplifier connection arrangement is able to achieve essentially the same high degree of noise cancellation as is achieved by the arrangement of FIG. 8.

Other modifications of the digit-sense winding arrangement in accordance with the invention are illustrated in FIGS. 12 and 14 which illustrate how the digit-sense windings can be arranged so as to provide the important advantage of delta noise cancellation in addition to the noisy cancellation already provided by the previously described embodiments.

The problem of delta noise arises in memories, generally, because, even though the windings of a memory are connected in common mode fashion, the noise cancelling which occurs during the write portion of a memory cycle as a result of digit current flow is only approximate, since the information pattern in one series string of windings may be different from that in its common mode string. Such differences in information patterns can result in a large unwanted signal, commonly referred to as delta noise, being applied to a memory sense amplifier during the write portion of a memory cycle. This unwanted signal, or delta noise, may be many times greater than the output signal obtained during reading, and requires that special precautions be taken in the design of the sense amplifier to prevent overloading and permit the sense amplifier to recover in time for the next memory cycle. Even so, the presence of this delta noise is often a severe limiting factor on the repetition rate capability of the memory.

Although the previously described embodiments of FIGS. 8 and 10 provide for a high degree of noise cancellation within each binary digit, as well as common mode rejection, whereby a much higher overall noise cancellation is achieved than is possible with other known approaches, it will be understood that, like conventional memories, they are still subject to delta noise problems, since each series string of a common mode pair (series strings A–C and B–E form one common mode pair and series strings F–H and G–J form another common mode pair) may store a different pattern of information.

In accordance with this invention, it has been discovered that the delta noise problem in a two element per bit memory can be substantially eliminated by taking advantage of the complementary nature of information storage therein. This is accomplished in accordance with the invention by providing complementary digit currents for the two element per bit memory in a manner which will produce cancellation of delta noise before it reaches the sense amplifier. FIGS. 12 and 14 illustrate the manner in which this delta noise cancelling feature may be applied to the digit-sense winding arrangements illustrated in FIGS. 8 and 10, respectively, so as to achieve delta noise cancellation. Although FIGS. 12 and 14 only illustrate the connection arrangement for digit planes $D_1$ and $D_2$ corresponding to bit 1, it will be understood that the same arrangement may be employed for the other binary digits.

Referring first to FIG. 12, it is to be noted that the same digit-sense winding arrangement and mode of operation is employed as previously described in connection with FIGS. 5–8, except that the diodes 41 and 42 and the matching impedances 2*Zo* at the digit driver end of the series strings are omitted, since they are not necessary for this embodiment. For such an organization of the digit-sense windings, the stored data pattern in series string A–C in FIG. 12 will necessarily be the identical complement of the stored data pattern in series string F–H, and likewise for series strings B–E and G–J. The embodiment of FIG. 12 takes advantage of this complementary relationship by making the digit currents provided by the $D_1$ and $D_2$ drivers 140 and 160 also complementary. As a result, any delta noise signal resulting from an unbalance in the stored data pattern in common-mode connected series strings A–C and B–E will be cancelled out in the sense amplifier transformer 50 by an equal and opposite delta noise signal produced by an identical stored data pattern unbalance in the other common-mode connected series strings F–H and G–J. The only signal propagated to the sense amplifier will then be that resulting from switching of the single selected magnetic element, which will be of the same magnitude as a readout signal and will, therefore, not overload the sense amplifier.

The operation of FIG. 12 will now be considered in detail using the explanatory graphs of FIG. 13 which illustrate operation during three typical read-write cycles. At the beginning of each cycle a read current $I_R$ is applied to a selected rod structure to drive all the elements thereon to the read saturation state, as previously described in connection with FIG. 4. This read current $I_R$ may typically have a magnitude of 2I. The write current $I_W$, which may typically have a magnitude of $-2I/3$ and which by itself is insufficient to cause switching out of the read saturation state, then follows in the second half of each cycle. The digit current, which may typically have a magnitude of $-I/3$, is set just prior to the write current $I_W$ and together therewith is able to cause switching out of the read saturation state, as previously described herein.

The specific manner in which digit current is provided in the embodiment of FIG. 12 will now be considered. Prior to the appearance of the write current $I_W$, either a "1" or a "0" data input pulse (depending upon whether a "1" or a "0" is to be stored) is provided to the logical network 100 in FIG. 12 to produce either an $f_1$ or $f_2$ pulse to either turn on flip-flop F, or turn it off, or leave it unchanged, as illustrated in the corresponding graphs in FIG. 13.

Flip-flop F has complementary outputs F and F' which provide for the complementary operation of the $D_1$ and $D_2$ drivers 140 and 160 as illustrated in FIG. 13. Logical network 100 is comprised of AND gates 101 to 104 and OR gates 106 and 108, and serves to control the setting of flip-flop F so as to permit a digit current to be applied to the appropriate digit plane $D_1$ or $D_2$ in accordance with the "1" or "0" value of the input data pulse and odd and even row signals whose true-false states are dependent upon the odd-even location of the selected rod structure. It will be noted in FIG. 13 that a previously set up digit current condition remains fixed until changed, and that one or the other of the digit plane drivers $D_1$ or $D_2$ is always on. This causes no problem during reading, since the read current $I_R$ of 2I is of sufficient magnitude to overcome the digit current of $-I/3$ if present.

Because of the complementary operation thus provided for the digit drivers as explained above, coupled with the complementary nature of stored data in series strings A–C and F–H and in series strings B–E and G–J, any delta noise signal produced in the sense amplifier transformer 50 during digit current switching because of a stored data unbalance in the common mode pair formed by strings A–C and B–E will be cancelled out by an equal and opposite delta noise signal produced by series strings F–H and G–J, as illustrated in the lowermost graphs in FIG. 13.

Next, reference is directed to FIG. 14 which illustrates how delta noise cancellation can be achieved employing a digit-sense winding arrangement as illustrated in FIG. 10 in which all the digit-sense windings in digit plane $D_1$ (also in digit planes $D_3$ and $D_5$) are "1" windings, and all the digit-sense windings in digit plane $D_2$ (also in digit planes $D_4$ and $D_6$) are "0" windings, so that all rod structures in the memory have a binary digit arrangement as illustrated by rod structure 15*a* in FIG. 7.

However, unlike the FIG. 10 mode of operation, the arrangement of FIG. 14 employs the same mode of operation as employed for FIGS. 8 and 12. That is, in the embodiment of FIG. 14, as in FIGS. 8 and 12, a "1" state of a binary digit is represented by the "1" winding of the pair of windings associated with each binary digit being switched out of its read staturation state, while the "0" winding is left in the read saturation state; and a "0" state of a binary digit is represented by the "0" winding being switched out of its read saturation state, while the "1" winding is left in the read saturation state. Thus, as is also the case for the embodiments of FIGS. 8 and 10, the state of a binary digit during reading in the embodiment of FIG. 14 is sensed by determining whether the magnetic element associated with the "1" or "0" winding of a binary digit has been switched by the read current $I_R$.

The use of such a mode of operation for the digit-sense winding arrangement of FIG. 14 produces a situation where either a sensed "1" or a "0" during reading may appear at the output of the sense amplifier as either a positive or a negative output pulse depending upon the odd-even row location of the selected rod structure. This will be understood by noting in FIG. 14 that magnetic elements associated with odd row "1" digit-sense windings in digit plane $D_1$, and even row "0" digit-sense windings in digit plane $D_2$, will both produce positive output pulses during reading; on the other hand, magnetic elements associated with even row "1" digit-sense windings in digit plane $D_1$ and odd row "0" digit-sense windings in digit plane $D_2$ will both produce positive output signals.

In order to permit a proper indication of whether a "1" or "0" is sensed during reading in the embodiment of FIG. 14, the positive and negative outputs of the bit sense amplifier 150 are logically decoded by AND gates 155 and 161, inverter 158, and OR gate 165 in response to odd row and even row signals (whose true-false states are dependent upon the odd-even row location of the selected rod structure) so as to produce a resultant output signal only if a "1" is sensed during reading.

During the write portion of the cycle, the embodiment of FIG. 14 operates basically the same as described for the embodiment of FIG. 12 with the F flip-flop operating in response to input pulses $f_1$ and $f_2$ to provide complementary operation of the $D_1$ and $D_2$ drivers 140 and 160, as illustrated in FIG. 13. Since, unlike in FIG. 12, all "1" windings in FIG. 14 are in one plane and all "0" windings are in the other plane, no logical decoding of the "1" and "0" data input pulses is required in the embodiment of FIG. 14, as is done in FIG. 12. The $f_1$ and $f_2$ pulses supplied by the digit plane selector 175, therefore, are the "1" and "0" data input pulses.

It will be understood that if a lower digit current is desired during writing in the embodiments described herein, an inhibit-enable mode maybe employed using a write current of $-5/6I$ and a digit current of $-I/6$ when switching is desired and $I/6$ otherwise. In the embodiments of FIGS. 12 and 14, the complementary digit currents provided by the digit drivers would then switch in complementary fashion between $I/6$ and $-I/6$.

An inhibit-enable mode may also be employed to provide a higher selection ratio during writing by using a write current of $-2I/3$, and a digit current of $-I/3$ if switching is desired and $I/3$ otherwise. The digit drivers in FIGS. 12 and 14 would then switch in complementary fashion between $I/3$ and $-I/3$.

The above examples of possible modifications and variations are only illustrative, and others could be provided. The present invention, therefore, is not to be considered as limited to the specific disclosure provided herein, but is to be considered as including all modifications and variations coming within the scope of the invention as defined in the appended claims.

What is claimed is:

1. In a memory, a large plurality of bistable elements constructed and arranged so that a pair of elements constitute one binary digit, a sensing means coupled to each element, means coupling first and second groups of said sensing means so as to form a first common mode pair, means coupling third and fourth groups of said sensing means so as to form a second common mode pair, said first, second, third and fourth groups of sensing means being chosen so that the data stored in said first common mode pair is the complement of the data stored in said second common mode pair, a first digit driver for said first common mode pair and a second digit driver for said second common mode pair, means controlling said first and second digit drivers so that the output of one is the complement of the other, a sense amplifier, and means coupling said first and second common mode pairs to said sense amplifier so that a delta noise signal appearing in one common mode pair as a result of the stored information pattern therein is substantially cancelled by an equal and opposite delta noise signal appearing in the other common mode pair.

2. In a two-element per bit memory, a large plurality of bistable elements constructed and arranged so that each binary digit is constituted by a pair of elements in which the data stored in one element of the pair is the complement of the data stored in the other element, a sensing means coupled to each element, a sense amplifier coupling means, means coupling first and second groups of said sensing means to said sense amplifier coupling means so as to form a first common mode pair, means coupling third and fourth groups of said sensing means to said sense amplifier coupling means so as to form a second common mode pair, said first and third groups being chosen so that said first group couples together sensing means corresponding to one element of a binary digit pair of elements while said third group couples sensing means corresponding to the other element of the binary digit pair, said second and fourth groups being chosen so that said second group couples sensing means corresponding to one element of a binary digit pair of elements while said fourth group couples sensing means corresponding to the other element of the binary digit pair, whereby said first and third groups contain complementary stored information patterns and said second and fourth groups contain complementary stored information patterns, said first and second common mode pairs being further coupled to said sense amplifier coupling means so that said first and third groups are coupled in an opposite polarity sense with respect to one another and said second and fourth groups are coupled in an opposite polarity sense with respect to one another, a first digit driver for said first common mode pair and a second digit driver for said second common mode pair, and means controlling said first and second drivers so that the output of one is the complement of the other.

3. The invention in accordance with claim 2, wherein said first common mode pair couples elements corresponding to the same binary value, and said second common mode pair couples elements corresponding to the other binary value.

4. The invention in accordance with claim 2, wherein said first and fourth groups couple elements corresponding to the same binary value, and said second and third groups couple elements corresponding to the other binary value.

5. The invention in accordance with claim 2, wherein each of said bistable elements is a bistable magnetic element, and wherein each sensing means is a sense winding inductively coupled to its respective magnetic element.

6. In a two-magnetic element per bit memory, a large plurality of bistable magnetic elements functionally arranged in a plurality of pairs of digit planes, each pair of digit planes comprising a plurality of bistable element pairs formed of one element from each digit plane of the digit plane pair, each bistable element pair constituting a binary digit, winding means coupling said magnetic elements so as to permit the storing and sensing of information therein, said winding means including a sense winding coupled to each magnetic element, a sense amplifier coupling means for each digit plane pair, said winding means also including means coupling first and second groups of sense windings in each digit plane to its respective sense amplifier coupling means so as to form a common mode pair such that the common mode pair in one digit plane of a digit plane pair has an information pattern which is the complement of the information pattern in the common mode pair of the other digit plane of the digit plane pair, digit driver means for providing digit current to said digit planes, means controlling said digit driver means so that the digit currents provided to each digit plane of a digit plane pair are complementary, said winding means further including means for coupling the common mode pairs of each digit plane pair to its respective sense amplifier coupling means so that a delta noise signal appearing in one common mode pair as a result of the stored information pattern therein is substantially cancelled by an equal and opposite delta noise signal appearing in the other common mode pair.

7. The invention in accordance with claim 6, wherein said bistable magnetic elements are formed of thin film magnetic material.

8. The invention in accordance with claim 6, wherein said elements are formed of a plurality of rod structures each having a thin film of magnetic material uniformly deposited thereon, and wherein each pair of elements constituting a binary digit is comprised of adjacent thin film portions on the same rod structure.

9. In a two-magnetic element per bit memory matrix, a plurality of rod elements each comprised of an inner substrate having a continuous thin film of bistable magnetic material uniformly deposited thereon, a plurality of concentric solenoid groups disposed along each rod element so that like positioned groups on different rod elements correspond to the same digit plane, each concentric group including at least a word solenoid and a digit-sense solenoid and the bistable thin film portion in the immediate vicinity of each concentric group being individually switchable, each pair of adjacent individually switchable bistable thin film portions on the same rod element corresponding to a binary digit whereby each pair of adjacent digit planes corresponds to the same binary digit for all rod elements in the matrix, means for applying read and write currents during separate read and write periods to the word solenoids of a single selected rod element, digit driver means for applying digit current to each digit plane, means for controlling said digit driver means so that the digit planes of each digit plane pair corresponding to a binary digit receive complementary digit currents, a sense amplifier coupling means for each digit plane pair, and means coupling the digit-sense solenoids in each digit plane pair to a respective sense amplifier coupling means so that common mode noise rejection is achieved for digit-sense solenoids in the same digit plane and so that the two digit-sense solenoids of each binary digit are connected in an opposite polarity sense.

10. In a two-element per bit memory matrix, a plurality of individually switchable bistable elements arranged in a plurality of pairs of digit planes, each digit plane comprising an array of bistable elements with like positioned elements in different digit planes aligned, each pair of aligned bistable elements in adjacent digit planes corresponding to a binary digit, means for switching a selected group of aligned bistable elements, an output winding coupled to each bistable element, a sense amplifier coupling means for each pair of digit planes corresponding to a binary digit, means coupling the output windings in each pair of digit planes corresponding to the same binary digit to its respective sense amplifier coupling means so that the two output windings of each binary digit are coupled in an opposite polarity sense, digit driver means for applying digit current to said digit planes, and means for controlling said digit driver means so that the digit planes of each pair of digit planes corresponding to the same binary digit receive complementary digit currents.

11. In a two-magnetic element per bit memory matrix, a plurality of individually switchable uniformly deposited thin film bistable magnetic elements arranged in a plurality of pairs of digit planes, each digit plane comprising a row-column array of bistable elements with like positioned elements in different digit planes aligned, each pair of aligned bistable elements in adjacent digit planes corresponding to a binary digit, liner selection means for selecting a single group of aligned bistable elements for switching, an output winding coupled to each bistable element, means connecting the output windings in each digit plane so as to form first and second series strings of output windings having substantially identical noise characteristics, a sense amplifier coupling means for each pair of digit planes corresponding to a binary digit, means coupling the thus formed series strings in each pair of digit planes corresponding to the same binary digit to its respective sense amplifier coupling means so that the first and second series strings are coupled in an opposite polarity sense in each digit plane and in the same polarity sense in different digit planes of each pair, and means for applying complementary digit currents to the digit planes in each pair of digit planes corresponding to a binary digit.

12. In a two-magnetic element per bit memory matrix, a plurality of individually switchable thin film bistable magnetic elements arranged in a plurality of pairs of digit planes, each digit plane comprising a row-column array of bistable elements with like-positioned elements in each digit plane aligned, each pair of aligned bistable elements in adjacent digit planes corresponding to a binary digit, means for partially switching from an initial state selected ones of the bistable elements in a single group of aligned elements but no more than one bistable element in each pair at a time, means for driving a single selected group of aligned bistable elements so as to cause any partially switched elements in the group to return to said initial state, an output winding coupled to each bistable element, a sense amplifier coupling means for each pair of digit planes corresponding to a binary digit, means coupling the output windings in each pair of digit planes corresponding to the same binary digit to its respective sense amplifier coupling means so that common mode noise rejection is achieved in each digit plane and so that the two output windings of each binary digit are coupled in an opposite polarity sense, and means for applying complementary digit currents to the digit planes in each pair of digit planes corresponding to a binary digit.

13. In a two-magnetic element per bit memory matrix, a plurality of parallel rod elements each comprised of an inner substrate having a continuous thin film of bistable magnetic material uniformly deposited thereon, a word solenoid disposed along each rod element, a plurality of digit-sense solenoids disposed along each rod element so that each plurality of like positioned digit-sense solenoids on different rod elements form a row-column array in a common digit plane, the bistable thin film portion in the immediate vicinity of each digit-sense solenoid being individually switchable, each pair of adjacent individually switchable bistable thin film portions on the same rod element corresponding to a binary digit whereby each pair of adjacent digit planes corresponds to the same binary digit for all rod elements in the matrix, means connecting the word solenoids of the rod elements in a linear selection arrangement, means connecting the digit-sense solenoids in each digit plane so as to form a first series string comprised of the digit-sense solenoids in odd rows and a second series string comprised of the digit-sense windings in even rows, a sense amplifier coupling means for each pair of digit planes corresponding to a binary digit, means coupling the thus formed series strings in each pair of digit planes corresponding to the same binary digit to its respective sense amplifier coupling means so that the odd and even row series strings are coupled in an opposite polarity sense in the same digit plane and in the same polarity sense in different digit planes of each pair, digit driver means for applying digit current to each digit plane, and means for controlling said digit driver means so that the digit planes of each pair of digit planes corresponding to the same binary digit receives complementary digit currents.

14. In a two-magnetic element per bit memory matrix, a plurality of parallel rod elements, each rod element being comprised of an inner substrate having a continuous thin film of bistable magnetic material uniformly deposited thereon, a word solenoid disposed along each rod element, a plurality of pairs of digit-sense solenoids disposed along each rod element so that each plurality of like positioned digit-sense solenoids on different rod elements form a row-column array in a common digit plane, the bistable thin film portion in the immediate vicinity of each digit-sense solenoid being individually switchable, each pair of adjacent individually switchable bistable thin film portions on the same rod element corresponding to a binary digit whereby each pair of adjacent digit planes corresponds to the same binary digit for all rod elements in the matrix, means connecting the digit-sense solenoids in each digit plane so as to form first and second series strings of output windings having substantially identical noise characteristics, means coupled to the word solenoids of said rod elements so as to cause a read or a write current to flow in the word solenoid of a single selected row element during respective read and write periods, and means for applying during a write period in accordance with the data to be written complementary digit currents to the digit planes of each pair of digit planes corresponding to the same binary digit, the magnitude and duration of said write current and said digit current being chosen so that neither is sufficient alone to switch a bistable thin film portion out of its initial state but that both acting together are sufficient to cause partial switching of each respective bistable thin film portion whose word and digit-sense solenoids simultaneously receive write current and digit current, said read current being chosen to be at least sufficient by itself to cause any such partially switched bistable thin film portion whose respective word winding receives read current to be switched back to said initial state.

15. The invention in accordance with claim 13, wherein the bistable thin film portions in each digit plane of a pair corresponding to a binary digit all represent the same binary value.

16. The invention in accordance with claim 15, wherein a sense amplifier is additionally provided at the output of each sense amplifier coupling means, and wherein logical decoding means are provided at the output of each sense amplifier to determine which binary digit is sensed during reading.

References Cited

UNITED STATES PATENTS

| | | | |
|---|---|---|---|
| 3,144,641 | 8/1964 | Raffel | 340—174 |
| 3,274,570 | 9/1966 | Brekne | 340—174 |
| 3,283,313 | 11/1966 | Hathaway | 340—174 |
| 3,293,626 | 12/1966 | Thome | 340—174 |
| 3,329,940 | 7/1967 | Barnes et al. | 340—174 |
| 3,339,187 | 8/1967 | Harding et al. | 340—174 |
| 3,315,241 | 4/1967 | Meier | 340—174 |

STANLEY M. URYNOWICZ, Jr., *Primary Examiner.*